No. 820,460. PATENTED MAY 15, 1906.
W. WHITTEN.
POT LIFTER.
APPLICATION FILED JAN. 26, 1905.
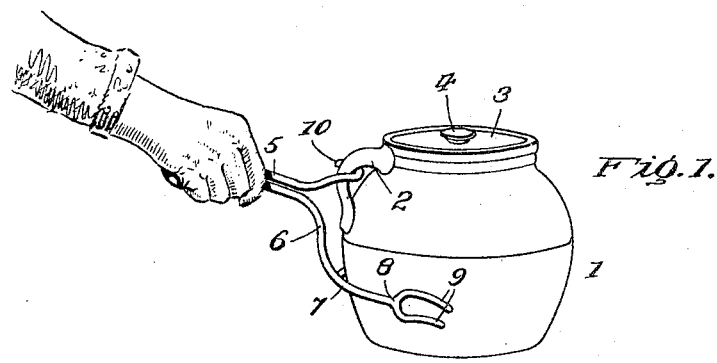
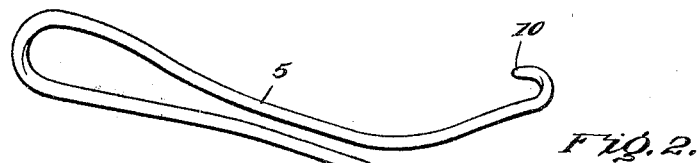
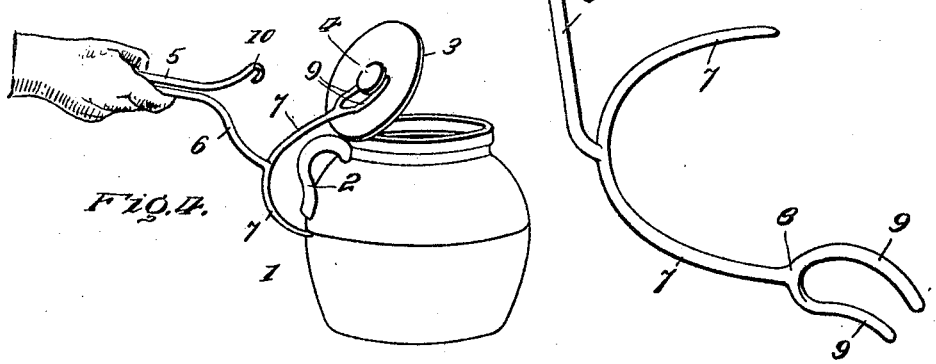
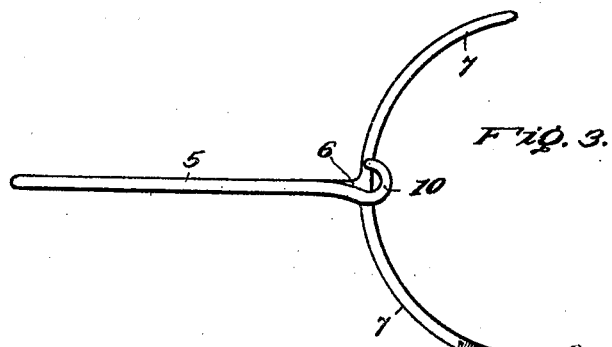
Inventor
Weston Whitten,
Witnesses
By
Attorneys

UNITED STATES PATENT OFFICE.

WESTON WHITTEN, OF UNITY, MAINE, ASSIGNOR OF ONE-HALF TO ALBERT BACON, OF UNITY, MAINE.

POT-LIFTER.

No. 820,460.     Specification of Letters Patent.     Patented May 15, 1906.

Application filed January 26, 1905. Serial No. 242,793.

*To all whom it may concern:*

Be it known that I, WESTON WHITTEN, a citizen of the United States, residing at Unity, in the county of Waldo and State of Maine, have invented certain new and useful Improvements in Pot-Lifters, of which the following is a specification.

This invention comprises a simple form of lifting device particularly designed for conveying heated pots or like receptacles from one place to another.

The invention is particularly adapted for lifting receptacles having a suitable handle; and the invention includes engaging means for taking the lid of the receptacle off or replacing it, as desired.

For a full description of the invention and the merits thereof and also to acquire a knowledge of the details of construction of the means for effecting the result reference is to be had to the following description and accompanying drawings, in which—

Figure 1 is a perspective view showing the invention in position upon a receptacle. Fig. 2 is a detail perspective view of the invention alone. Fig. 3 is a plan view of the lifter. Fig. 4 is a perspective view showing the device in operative position, as when removing a lid of a receptacle.

My improved pot-lifter is designed principally for use with bean-pots of ordinary form, one of which is herein illustrated, comprising a top 1, having a handle 2, and provided with a lid having the customary knob-like projection 4, which ordinarily forms a handle in the manipulation of the lid in removing or replacing the same from and upon the body 1.

My improved lifter consists of a curved brace 7, provided at one end only with a fork 8, providing spaced engaging members 9. The curvature of the brace 7 corresponds approximately to the curvature of the body 1 of the pot, and the members 9 of the fork 8 at one end of said brace are adapted to engage the handle or projection 4 of the lid 3, so as to admit of using the device in removing and replacing its closure in a manner which will be hereinafter specifically described. To the middle portion of the curved brace 7 there is connected one end of a bar which initially extends from the curved brace in a direction substantially perpendicular to the plane of the brace, whereby to form a shank 6. The bar forming said shank then extends angularly from said shank in an outward direction from the curved brace, whereby to form one member of a handle portion 5, and is then returned upon itself to form the other portion of the handle member 5 and extends obliquely away from the shank 6 at the point where the shank merges into the first-named handle member, and the other end or extremity of said bar is returned upon itself in a plane approximately parallel with the plane of the brace, whereby said returned extremity forms a side entering hook 10, designed to engage with handle 2 of the pot when the curved brace 7 extends around the pot, as illustrated in Fig. 1. The curved brace 7 possesses two functions and coacts both with the hook 10 and with the fork 9, as will be now explained.

In the practical use of the device to remove bean-pots or like receptacles from the oven or the like the handle portion 5 is grasped and the brace 7 is placed against the side of the pot below the handle 2, while the hook 10 is entered laterally into the handle 2 and engages the same. When in this position, it is manifest that the top may be conveniently lifted as a whole, the curved brace 7 in said application coacting with the hook 10 for this purpose. After the pot has been bodily removed the lifter may be conveniently released from the position just described and turned axially, so as to insert its fork members 9 underneath and on opposite sides of the knob-like handle 4 of the lid 3. At the same time the other end of the curved brace 7 will be placed in contact with the side of the pot, and then by a downward movement of the device on the said end as a fulcrum the lid 3 may be tilted to an open position, as shown in Fig. 4 of the drawings, and be conveniently lifted from the body 1 of the pot. It is evident that this initial tilting movement of the lid is useful preparatory to lifting the lid bodily from the pot, because by so doing engagement of the handle 4 with the members 9 is insured, and liability of dropping the lid and breaking the same is consequently obviated. In lifting the lid from the body of the pot the curved brace 7, as has just been described, coacts with the fork, as well as coacting with the hook 10 in the other position of the lifting device.

Having thus described the invention, what is claimed as new is—

As an improved article of manufacture, a pot-lifter consisting of a curved brace 7 provided at one end with a fork, and a bar having one end connected to the curved brace at the middle thereof, and said bar extending from said brace substantially perpendicularly to the plane of said brace whereby to form a shank 6, and said bar further extending in an angular direction from the upper end of said shank and in a direction outwardly from the said curved brace whereby to form one member of a handle and being returned upon itself whereby to form the other member of said handle, the other end or extremity of said bar being returned upon itself in a plane approximately parallel with the plane of the brace to form a side entering hook designed to engage a handle of a pot, whereby said brace will coact with said hook to lift the top bodily, and whereby also the fork end of said brace will engage the pot-lid and the other end of said brace rest against the side of a pot and constitute a fulcrum upon which the lifter may be moved to tilt the lid to an open position, preparatory to moving it bodily from the pot.

In testimony whereof I affix my signature in presence of two witnesses.

WESTON WHITTEN. [L. S.]

Witnesses:
HELEN U. BATCHELDER,
RALPH I. MORSE.